(12) United States Patent
Yamaguchi et al.

(10) Patent No.: US 7,330,198 B2
(45) Date of Patent: Feb. 12, 2008

(54) THREE-DIMENSIONAL OBJECT MANIPULATING APPARATUS, METHOD AND COMPUTER PROGRAM

(75) Inventors: Kosuke Yamaguchi, Kanagawa (JP); Ken Miyashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 176 days.

(21) Appl. No.: 10/785,263

(22) Filed: Feb. 24, 2004

(65) Prior Publication Data
US 2004/0164956 A1    Aug. 26, 2004

(30) Foreign Application Priority Data
Feb. 26, 2003   (JP)   ............................ P2003-050093

(51) Int. Cl.
*G09G 5/00*   (2006.01)

(52) U.S. Cl. ...................... 345/653; 345/650; 345/672; 345/679

(58) Field of Classification Search ........ 345/649–659, 345/157
See application file for complete search history.

(56) References Cited

U.S. PATENT DOCUMENTS 5,019,809 A  *  5/1991  Chen ...................... 340/815.42
5,428,721 A  *  6/1995  Sato et al. .................. 345/650

(Continued)

FOREIGN PATENT DOCUMENTS

| JP | 02-069798 | 3/1990 |
|---|---|---|
| JP | 03-250267 | 11/1991 |
| JP | 5-290146 | 5/1993 |
| JP | 05-151332 | 6/1993 |

(Continued)

OTHER PUBLICATIONS

Maruyama Yukiko, et al., Development of a Computer-Aided-Education System of the polyhedra, Journal of Chemical Software, The Chemical Software Society, Mar. 6, 2002, vol. 8, No. 2.

(Continued)

*Primary Examiner*—Kee M. Tung
*Assistant Examiner*—Michelle K Lay
(74) *Attorney, Agent, or Firm*—Finnegan, Henderson, Farabow, Garrett & Dunner, L.L.P.

(57) ABSTRACT

When the user touches a display screen, a touch-operated input device (7) detects a coordinate of a user-touched point on the display screen and a touch-input conversion program is executed to determine an axis, direction and speed of rotation of a three-dimensional object (40) on the basis of the user-defined coordinate, and give the information to a three-dimensional rendering program. The three-dimensional rendering program is executed to make a calculation for rotating the three-dimensional object (40) on the basis of the given information. The axis, direction and speed of the three-directional object rotation are repeatedly calculated in a fixed cycle only while the coordinate is kept defined by the user by continuously touching the display screen. Upon completion of each calculation, the results of calculation are given to the three-dimensional rendering program. Therefore, each time the user defines another point while continuously touching the display screen, the results of calculation of the axis, direction and speed of rotation change and thus the rotation of the three-dimensional object is dynamically changed. The present invention thus permits the user to intuitively make an manipulation, that is, rotation, movement, scale up or down, of a three-dimensional object with the use of the touch-operated input device.

6 Claims, 11 Drawing Sheets

U.S. PATENT DOCUMENTS

| | | | | |
|---|---|---|---|---|
| 5,557,714 | A | * | 9/1996 | Lines et al. .................. 345/653 |
| 5,588,097 | A | * | 12/1996 | Ono et al. .................. 345/653 |
| 5,588,098 | A | * | 12/1996 | Chen et al. .................. 345/653 |
| 5,615,384 | A | * | 3/1997 | Allard et al. ................ 715/800 |
| 5,714,977 | A | * | 2/1998 | Mc Neil ...................... 345/157 |
| 6,437,798 | B1 | * | 8/2002 | Aoki ........................... 345/649 |
| 2001/0017624 | A1 | * | 8/2001 | Noettling .................... 345/421 |
| 2001/0033280 | A1 | * | 10/2001 | Abe et al. ................... 345/419 |
| 2001/0055031 | A1 | * | 12/2001 | Andersson .................. 345/653 |
| 2004/0246269 | A1 | * | 12/2004 | Serra et al. ................. 345/619 |

FOREIGN PATENT DOCUMENTS

| | | |
|---|---|---|
| JP | 05-290146 | 11/1993 |
| JP | 07-005980 | 1/1995 |
| JP | 07-085303 | 3/1995 |
| JP | 07-168934 | 7/1995 |
| JP | 7-5980 | 10/1995 |
| JP | 08-137620 | 5/1996 |
| JP | 2000-020754 | 1/2000 |
| JP | 2001-134382 | 5/2001 |
| JP | 2002-092651 | 3/2002 |
| JP | 2003-037813 A | 2/2003 |
| WO | WO 03/005304 A1 | 1/2003 |

OTHER PUBLICATIONS

Notification of Reasons for Refusal from Japanese Patent Office mailed Dec. 6, 2006, in Japanese Application No. 2003-050093, and English translation thereof.

Notification of Reasons for Refusal from Japanese Office, dated Mar. 20, 2007, in Japanese Application No. 2003-050093, and English translation thereof.

Maruyama Yukiko, et. al., Development of a Computer-Aided-Education System of the polyhedra, Journal of Chemical Software, The Chemical Software Society, Mar. 6, 2002, vol. 8, No. 2.

Matsubara Satoshi, et. al., Introduction of Java 3D Graphics, Edition 1, Morikita Publishing Co., Ltd., Jun. 11, 2002, Edition 1, pp. 201-234.

Notification of Reasons for Refusal from Japanese Patent Office mailed Dec. 6, 2006, in Japanese Application No. 2003-050093, and English translation thereof.

* cited by examiner

THREE-DIMENSIONAL OBJECT MANIPULATING APPARATUS, METHOD AND COMPUTER PROGRAM

BACKGROUND OF THE INVENTION

1. Field of the Invention

The present invention relates to an apparatus, method and computer program, for rotating, moving, scaling up or down or otherwise manipulating a three-dimensional object on a display screen by a touch-operated input device.

This application claims the priority of the Japanese Patent Application No. 2003-050093 filed on Feb. 26, 2003, the entirety of which is incorporated by reference herein.

2. Description of the Related Art

Generally, a pointing device such as a mouse or the like is used to rotate, move, scale up or down or otherwise manipulate a three-dimensional object displayed on a display screen. With the pointing device like the mouse, the user can intuitively make a pointing operation with a high degree of freedom because a movement of the user's hand or finger precisely results in a movement of a pointing cursor on the display screen.

However, the pointing device such as a mouse can only be used smoothly and comfortably in an ample operating space. There will arise no problem with a pointing device which is used with an apparatus to which a variety of peripheral devices is to be connected, such as a personal computer or the like. But the pointing device is not suitable for use with a portable information device such as a mobile phone or PDA (portable digital assistant) as well as with a portable electronic appliance such as digital video camcorder (=camera/recorder) or the like.

Many of recent portable electronic appliances such as the portable phone, PDA, digital video camcorder, etc. have installed therein a touch-operated input device like a touch-sensor panel as an input device to enable the user to select an object such as an icon or the like in a menu screen.

The touch-operated input device is disposed opposite to the display screen. When the user touches, by the fingertip or a pen, directly an arbitrary position on the display screen of the touch-operated input device, the touch-operated input device can detect the coordinate of the user-touched position and provide an event equal to that provided by the mouse, such as click or double click. There have been proposed various types of touch-operated input devices such as an analog capacitive-coupling type, resistive membrane type and the like. Since the touch-operated input device can be incorporated directly in a display unit, it does not need any operating space which would be required for operation of a mouse. Namely, the input device of this type can be said to be suitable for use with the above-mentioned portable electronic appliance.

The well-known techniques for manipulating a three-dimensional object displayed on a display screen, for example, rotating it, by the touch-operated input device include a method of defining an axis and angle of rotation by defining, by a tablet, a coordinate on the surface of a semitransparent ball displayed on a three-dimensional object, for example (as disclosed in the Japanese Published Unexamined Patent Application No. 1993-290146, paragraphs 0009 and 0010, for example), a technique for converting a movement of a position of contact on a spherical surface into an angle of rotation of a three-dimensional object by the use of a spherical or cylindrical sensor capable of detecting the position of contact on the spherical surface (as disclosed in the Japanese Published Unexamined Patent Application No. 1995-5980, for example), etc.

However, if any of the above-mentioned well-known techniques is applied in a portable electronic appliance such as a portable phone, PDA, digital video camcorder or the like for viewing any other aspect of a three-dimensional object, or moving a three-dimensional object to another on-screen position or scaling it down because it is obstructive on the display screen, for example, the electronic appliance will be complicated in construction and thus difficult to operate. That is, such an electronic appliance is not appropriate for ordinary users.

OBJECT AND SUMMARY OF THE INVENTION

It is therefore an object of the present invention to overcome the above-mentioned drawbacks of the related art by providing an apparatus, method and computer program, capable of easily rotating, moving, scaling up or down or otherwise manipulating a three-dimensional object on a display screen by defining a coordinate by the user touching the display screen.

The above object can be attained by providing a three-dimensional object manipulating apparatus including, according to the present invention, a display means for displaying a three-dimensional object on the screen of a display unit; a coordinate detecting means for detecting a coordinate defined on the display screen by a user's touch; a determination means for determining an axis and direction of rotation for the three-dimensional object in a predetermined cycle on the basis of the coordinate detected by the coordinate detecting means; and an object rotating means for rotating the three-dimensional object on the basis of the result of determination supplied from the determination means.

The above three-dimensional object manipulating apparatus permits the user to rotate a three-dimensional object being displayed about an arbitrary axis of rotation in an arbitrary direction of rotation only by defining one coordinate by touching the display screen. Also, the user can only rotate the three-dimensional object while defining the coordinate on the display screen. So, the user can intuitively make an intended manipulation of the three-dimensional object.

According to another aspect of the above three-dimensional object manipulating apparatus, the determination means determines the axis and direction of rotation for the three-dimensional object on the basis of a positional relation between the coordinate detected by the coordinate detecting means and a central coordinate on the display screen.

With the above three-dimensional object manipulating apparatus, the user can select a coordinate for determining the axis and direction of rotation with reference to the central coordinate and thus easily rotate the three-dimensional object as intended.

According to still another aspect of the above three-dimensional object manipulating apparatus, the determination means further determines a rotating speed for the three-dimensional object on the basis of a distance between the coordinate detected by the coordinate detecting means and a central coordinate on the display screen, and the object rotating means rotates the three-dimensional object at the determined speed.

With the above three-dimensional object manipulating apparatus, the user can rotate the three-dimensional object at an intended speed. Namely, the three-dimensional object manipulating apparatus according to the present invention has a further improved operability.

According to yet another aspect of the above three-dimensional object manipulating apparatus, the determination means determines an axis and direction of rotation for the three-dimensional object on the basis of a positional relation between the coordinate detected by the coordinate detecting means and the three-dimensional object on the display screen.

With the above three-dimensional object manipulating apparatus, the user can select a coordinate for determining the axis and direction of rotation with reference to the position of the three-dimensional object on the display screen and thus easily rotate the three-dimensional object as intended.

According to still yet another aspect of the above three-dimensional object manipulating apparatus, the determination means determines a rotating speed for the three-dimensional object on the basis of a distance between the coordinate detected by the coordinate detecting means and barycentric coordinate of the three-dimensional object on the display screen, and the object rotating means rotates the three-dimensional object at the determined speed.

With the above three-dimensional object manipulating apparatus, the user can rotate the three-dimensional object at an intended speed. Namely, the three-dimensional object manipulating apparatus according to the present invention has a further improved operability.

Also, the above object can be attained by providing a three-dimensional object manipulating apparatus including, according to the present invention, a display means for displaying a three-dimensional object on the screen of a display unit; a coordinate detecting means for detecting a coordinate defined on the display screen by a user's touch; a determination means for determining a moving direction for the three-dimensional object in a predetermined cycle on the basis of the coordinate detected by the coordinate detecting means and barycentric coordinate of the three-dimensional object on the display screen; and an object moving means for moving the three-dimensional object on the basis of the result of determination supplied from the determination means.

The above three-dimensional object manipulating apparatus permits the user to move a three-dimensional object being displayed to an arbitrary position only by defining one coordinate by touching the display screen. Also, the user can move the three-dimensional object only while defining the coordinate on the display screen. So, the user can intuitively make an intended manipulation of the three-dimensional object.

According to another aspect of the above three-dimensional object manipulating apparatus, the determination means determines a moving speed on the basis of a distance between the coordinate detected by the coordinate detecting means and barycentric coordinate of the three-dimensional object on the display screen, and the object rotating means moves the three-dimensional object at the determined speed.

With the above three-dimensional object manipulating apparatus, the user can move the three-dimensional object at an intended speed. Namely, the three-dimensional object manipulating apparatus according to the present invention has a further improved operability.

Also, the above object can be attained by providing a three-dimensional object manipulating apparatus including, according to the present invention, a display means for displaying a three-dimensional object on the screen of a display unit; a coordinate detecting means for detecting a coordinate defined on the display screen by a user's touch; a determination means for determining whether the three-dimensional object is to be scaled up or down in a predetermined cycle on the basis of the coordinate detected by the coordinate detecting means; and an object scale-up/-down means for scaling up or down the three-dimensional object on the basis of the result of determination supplied from the determination means.

The above three-dimensional object manipulating apparatus permits the user to scale up or down a three-dimensional object being displayed is for the user to define one coordinate by touching the display screen. Also, the user can scale up or down the three-dimensional object only while defining the coordinate on the display screen. So, the user can intuitively make an intended manipulation of the three-dimensional object.

Also, the above object can be attained by providing a three-dimensional object manipulating method in which there are used a display unit, data processor and a coordinate detector which detects a coordinate defined on the display screen by a user's touch, the method including, according to the present invention, the steps of displaying, under control of the data processor, a three-dimensional object on the screen of the display unit; determining, under control of the data processor, an axis and direction of rotation for the three-dimensional object in a predetermined cycle on the basis of the coordinate detected by the coordinate detector; and rotating, under control of the data processor, the three-dimensional object on the basis of the result of determination.

The above three-dimensional object manipulating method permits the user to rotate a three-dimensional object being displayed about an arbitrary axis of rotation in an arbitrary direction of rotation only by defining one coordinate by touching the display screen. Also, the user can only rotate the three-dimensional object while defining the coordinate on the display screen. So, the user can intuitively make an intended manipulation of the three-dimensional object.

According to another aspect of the above three-dimensional object manipulating method, the data processor determines the axis and direction of rotation for the three-dimensional object on the basis of a positional relation between the coordinate detected by the coordinate detector and a central coordinate on the display screen.

By the above three-dimensional object manipulating method, the user can select a coordinate for determining the axis and direction of rotation with reference to the central coordinate and thus easily rotate the three-dimensional object as intended.

According to still another aspect of the above three-dimensional object manipulating method, the data processor further determines a rotating speed for the three-dimensional object on the basis of a distance between the coordinate detected by the coordinate detector and a central coordinate on the display screen, and rotates the three-dimensional object at the determined speed.

By the above three-dimensional object manipulating method, the user can rotate the three-dimensional object at an intended speed. Namely, the three-dimensional object can be rotated more easily.

According to yet another aspect of the above three-dimensional object manipulating method, the data processor determines an axis and direction of rotation for the three-dimensional object on the basis of a positional relation between the coordinate detected by the coordinate detector and the three-dimensional object on the display screen.

By the above three-dimensional object manipulating method, the user can select a coordinate for determining the axis and direction of rotation with reference to the position of the three-dimensional object on the display screen and thus easily rotate the three-dimensional object as intended.

According to still yet another aspect of the above three-dimensional object manipulating method, the data processor further determines a rotating speed for the three-dimensional object on the basis of a distance between the coordinate detected by the coordinate detector and barycentric coordinate of the three-dimensional object on the display screen, and rotates the three-dimensional object at the determined speed.

By the above three-dimensional object manipulating method, the user can rotate the three-dimensional object at an intended speed. Namely, the three-dimensional object can be rotated more easily.

Also, the above object can be attained by providing a three-dimensional object manipulating method in which there are used a display unit, data processor and a coordinate detector which detects a coordinate defined on the display screen by a user's touch, the method including, according to the present invention, the steps of displaying, under control of the data processor, a three-dimensional object on the screen of the display unit; determining, under control of the data processor, a moving direction for the three-dimensional object in a predetermined cycle on the basis of the coordinate detected by the coordinate detector; and moving, under control of the data processor, the three-dimensional object on the basis of the result of determination.

The above three-dimensional object manipulating method permits the user to move a three-dimensional object being displayed to an arbitrary position only by defining one coordinate by touching the display screen. Also, the user can only move the three-dimensional object while defining the coordinate on the display screen. So, the user can intuitively make an intended manipulation of the three-dimensional object.

According to another aspect of the above three-dimensional object manipulating method, the data processor further determines a moving speed for the three-dimensional object on the basis of a distance between the coordinate detected by the coordinate detector and barycentric coordinate of the three-dimensional object on the display screen, and moves the three-dimensional object at the determined speed.

By the above three-dimensional object manipulating method, the user can move the three-dimensional object at the determined speed. Namely, the three-dimensional object can be rotated more easily.

Also, the above object can be attained by providing a three-dimensional object manipulating method in which there are used a display unit, data processor and a coordinate detector which detects a coordinate defined on the display screen by a user's touch, the method including, according to the present invention, the steps of displaying, under control of the data processor, a three-dimensional object on the screen of the display unit; determining, under control of the data processor, whether the three-dimensional object is to be scaled up or down in a predetermined cycle on the basis of the coordinate detected by the coordinate detector; and scaling up or down, under control of the data processor, the three-dimensional object on the basis of the result of determination.

The above three-dimensional object manipulating method permits the user to scale up or down a three-dimensional object being displayed to an arbitrary position only by defining one coordinate by touching the display screen. Also, the user can only scale up or down the three-dimensional object while defining the coordinate on the display screen. So, the user can intuitively make an intended manipulation of the three-dimensional object.

Also, the above object can be attained by providing a computer program allowing, according to the present invention, a computer to function as a display means for displaying a three-dimensional object on the screen of a display unit; a determination means for determining an axis and direction of rotation for the three-dimensional object in a predetermined cycle on the basis of the coordinate detected by a coordinate detecting means for detecting a coordinate defined on the display screen by a user's touch; and an object rotating means for rotating the three-dimensional object on the basis of the result of determination supplied from the determination means.

The above computer program permits the user to rotate a three-dimensional object being displayed about an arbitrary axis of rotation in an arbitrary direction of rotation only by defining one coordinate by touching the display screen. Also, the user can only rotate the three-dimensional object while defining the coordinate on the display screen. So, the user can intuitively make an intended manipulation of the three-dimensional object.

Also, the above object can be attained by providing a computer program allowing, according to the present invention, a computer to function as a display means for displaying a three-dimensional object on the screen of a display unit; a determination means for determining a moving direction for the three-dimensional object in a predetermined cycle on the basis of the coordinate detected by a coordinate detecting means for detecting a coordinate defined on the display screen by a user's touch and barycentric coordinate of the three-dimensional object on the display screen; and an object moving means for moving the three-dimensional object on the basis of the result of determination supplied from the determination means.

The above computer program permits the user to move a three-dimensional object being displayed to an arbitrary position only by defining one coordinate by touching the display screen. Also, the user can move the three-dimensional object only while defining the coordinate on the display screen. So, the user can intuitively make an intended manipulation of the three-dimensional object.

Also, the above object can be attained by providing a computer program allowing, according to the present invention, a computer to function as a display means for displaying a three-dimensional object on the screen of a display unit; a determination means for determining whether the three-dimensional object is to be scaled up or down in a predetermined cycle on the basis of the coordinate detected by a coordinate detecting means for detecting a coordinate defined on the display screen by a user's touch; and an object scale-up/-down means for scaling up or down the three-dimensional object on the basis of the result of determination supplied from the determination means.

The above computer program permits the user to scale up or down a three-dimensional object being displayed is for the user to define one coordinate by touching the display screen. Also, the user can scale up or down the three-dimensional object only while defining the coordinate on the display screen. So, the user can intuitively make an intended manipulation of the three-dimensional object.

These objects and other objects, features and advantages of the present invention will become more apparent from the

DETAILED DESCRIPTION OF THE PREFERRED EMBODIMENTS

The present invention will be described in detail concerning the embodiments thereof with reference to the accompanying drawings.

Figure 1:
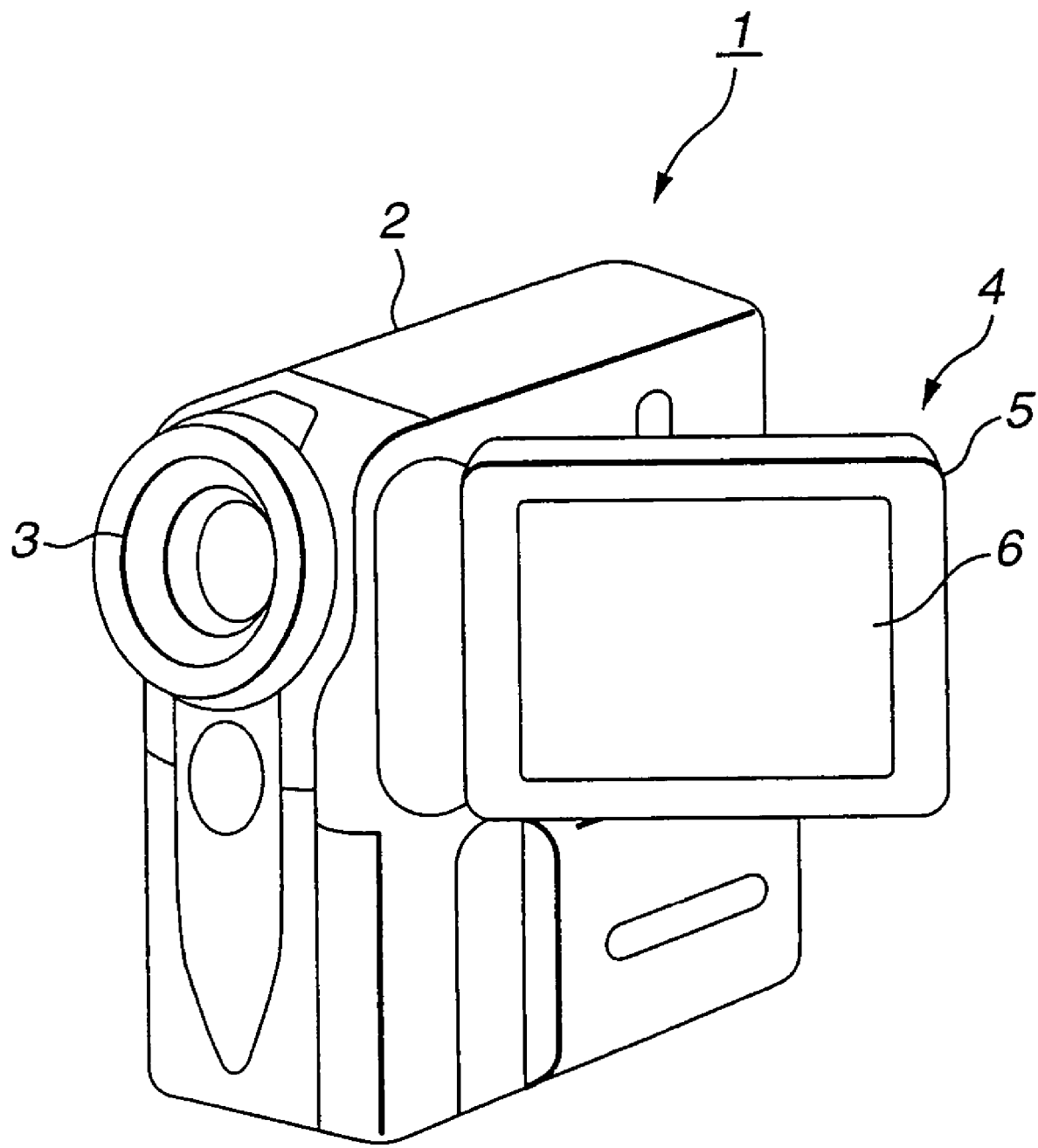
FIG. 1 is a perspective view of a digital video camcorder as a first embodiment of the electronic appliance according to the present invention.

Referring now to FIG. 1, there is schematically illustrated in the form of a perspective view the digital video camcorder as the first embodiment of the electronic appliance to which the present invention is applied.

The digital video camcorder, generally indicated with a reference number 1, includes a body 2 having an appropriate shape and size for the user to operate the digital video camcorder 1 while holding the latter in one hand. The body 2 is provided with a lens unit 3, a display unit 4 with a touch panel, etc. On the screen of the display unit 4 with the touch panel, there are to be displayed an image of a captured object, an image read from a storage medium set in the digital video camcorder 1, an icon menu for allowing the user to select a function to be performed by the digital video camcorder 1, etc.

Figure 2:
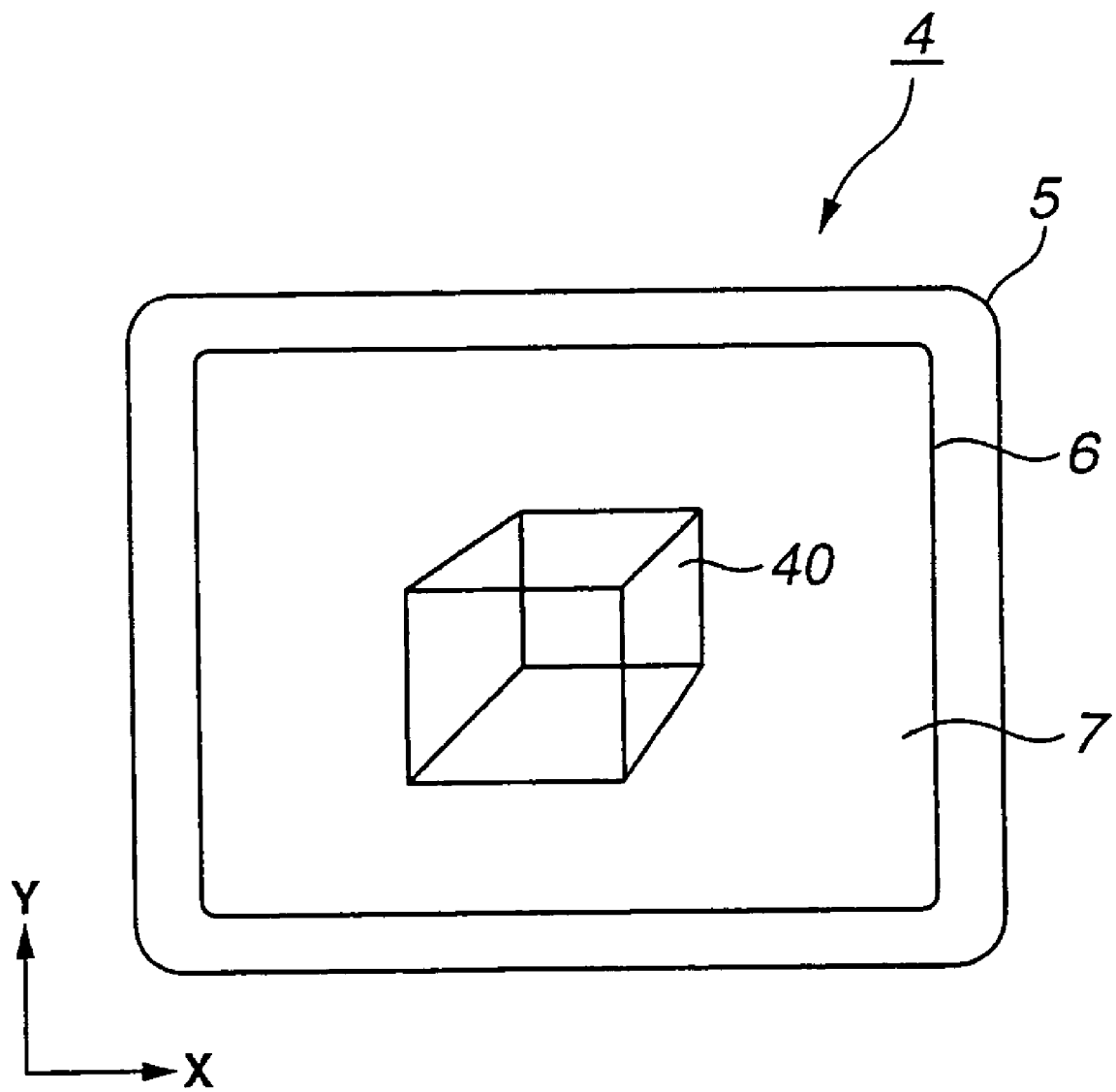
FIG. 2 is a plan view of a display unit, with a touch panel, of the digital video camcorder in FIG. 1.

FIG. 2 is a detailed plan view of the display unit 4, with a touch panel, of the digital video camcorder 1 in FIG. 1. The display unit 4 with the touch panel includes a rectangular casing 5 having disposed on one side thereof the screen of a display device 6 such as an LCD (liquid crystal display) panel, for example. Also, the display unit 4 has provided on the screen thereof a touch-operated input device 7 like a touch-sensor panel as a coordinate detector to detect a coordinate for manipulating each three-dimensional object on the display screen in various manners.

The touch-operated input device 7 is disposed on the screen of the display device 6. By touching, by a fingertip or a pen, directly an arbitrary position on the display screen, the touch-operated input device 7 detects the coordinate of the touched position. Namely, the touch-operated input device 7 is an input device which can provide an event equal to that provided by a mouse or the like, such as click or double click.

Figure 3:
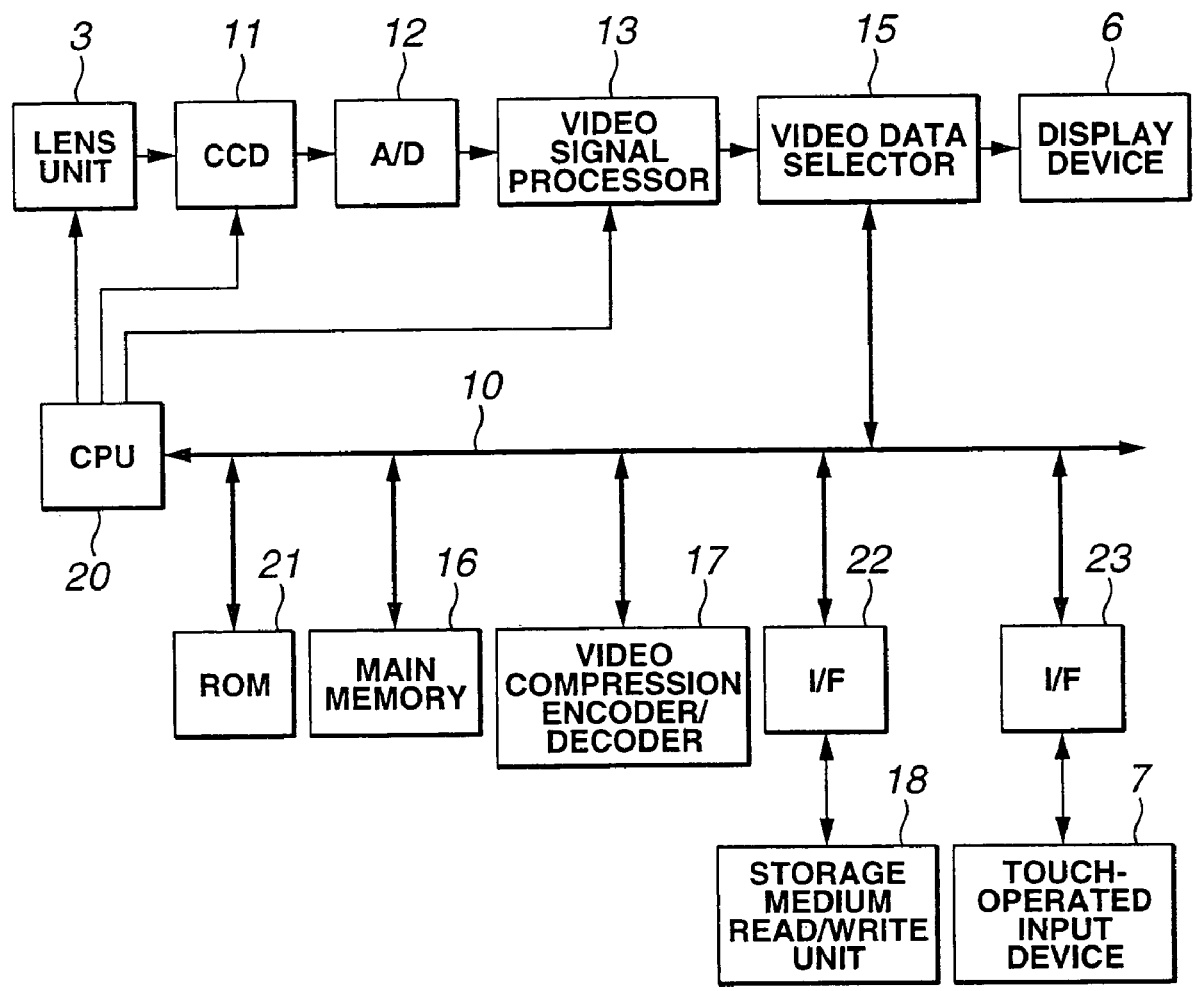
FIG. 3 is a block diagram of the digital video camcorder in FIG. 1, showing the electrical connection in the digital video camcorder.

FIG. 3 is a block diagram of the digital video camcorder 1 in FIG. 1, showing the electrical connection in the digital video camcorder 1. As shown, the lens unit 3 has the aperture or focus thereof automatically controlled by a control signal from a CPU 20. An output signal from a CCD (charge-coupled device) 11 is converted by an A-D (analog-digital) converter 12 into a digital video signal, and then passed to a video signal processor 13. The video signal processor 13 generates RGB signal for each of pixels in the supplied digital video signal, and supplies the RGB signals to the display device 6 via a video data selector 15.

The CPU 20 has connected to a bus 10 thereof a main memory 16, ROM (read-only memory) 21, video compression encoder/decoder 17 and the video data selector 15. The main memory 16 includes a DRAM (dynamic random access memory) or the like and is capable of rapid data read and write. It is used as a working area of the CPU 20, display frame buffer or the like. The ROM 21 is a non-volatile memory having various programs and data fixedly stored therein. The video compression encoder/decoder 17 is a circuit module to compress or expand a static image using JPEG (Joint Photographic Experts Group) and a moving image using MPEG (Moving Picture Experts Group), for example. The video data selector 15 selects a destination to which video data is to be transferred.

To the bus 10, there are further connected a storage medium read/write unit 18 to read and write data from and to a storage medium such as a memory stick, smart medium, magnetic tape, hard disk drive or the like, touch-operated input device 7, etc. via interfaces (I/F) 22 and 23, respectively.

The CPU 20 controls information transfer between the system components via the bus 10, and it loads a necessary program and data from the ROM 21 to the main memory 16 to control the digital video camcorder 1 according to the program and make a variety of data processing.

Next, there will be illustrated and explained a system for displaying a three-dimensional object on the screen of the display device 6 of the digital video camcorder 1 and manipulate the three-dimensional object using the touch-operated input device 7.

Figure 4:
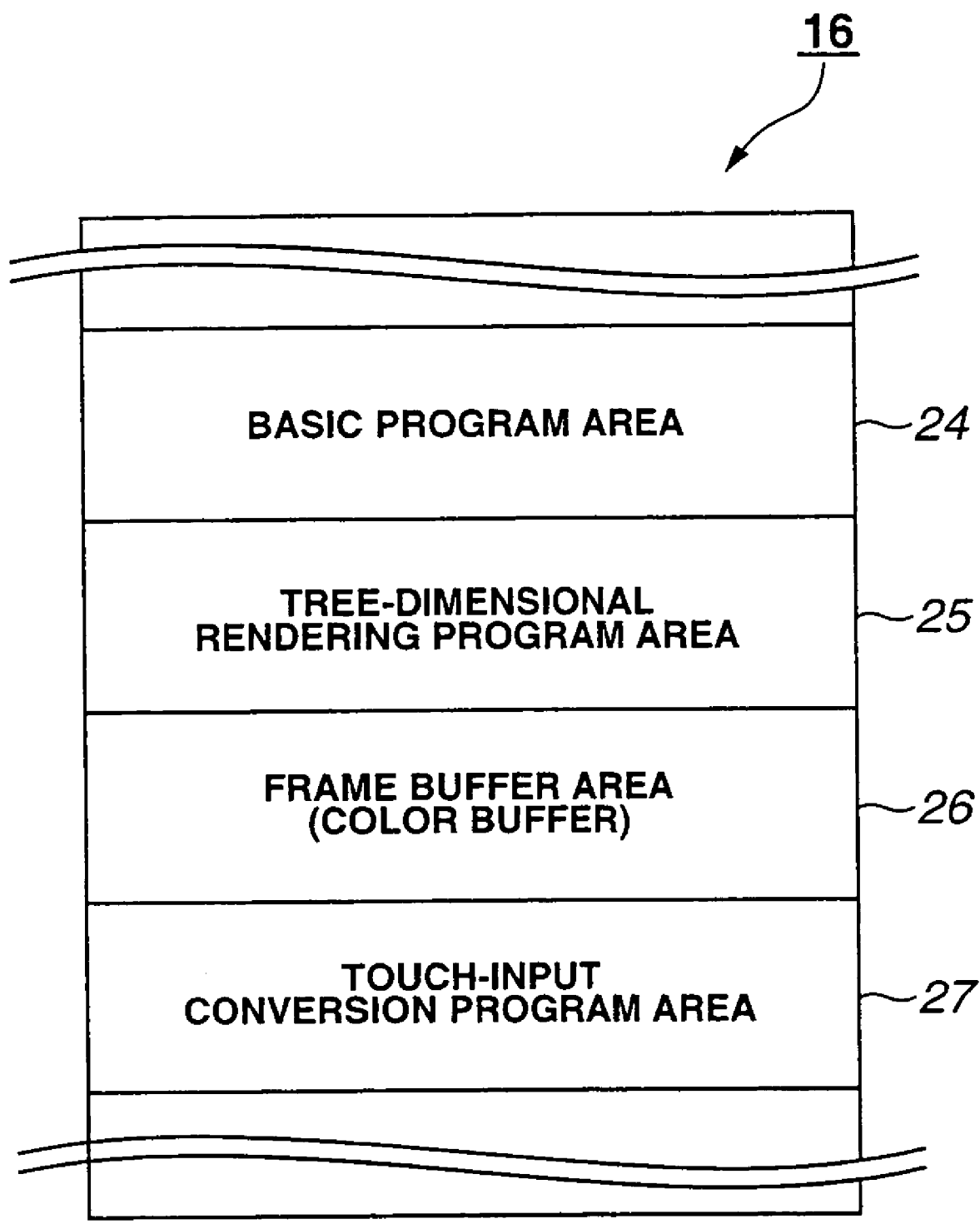
FIG. 4 shows program and data storage areas in a main memory, which are secured when a three-dimensional object is manipulated by a touch-operated input device.

FIG. 4 shows program and data storage areas in the main memory 16, which are secured when the three-dimensional object is manipulated by the touch-operated input device 7. As shown, the main memory 16 has defined therein at least a basic program area 24, three-dimensional rendering program area 25, frame buffer area 26, touch-input conversion program area 27, etc.

In the basic program area 24, there is stored a basic program for operating the digital video camcorder 1.

The three-dimensional program area 25 is an area for storage of a three-dimensional rendering program for rendering a three-dimensional object as well as for editorial manipulation, such as rotation, movement, scale up or down of the three-dimensional object.

The frame buffer area 26 stores data to be displayed on the screen of the display device 6.

The touch-input conversion program area 27 stores a touch-input conversion program for converting an operation of the touch-operated input device 7 into a command and parameter that can be interpreted by the three-dimensional rendering program. The touch-input conversion program determines a clicking operation, pressing operation, clockwise or counterclockwise rotation, for example, of the touch-operated input device 7 as an event, generates a command and parameter on the basis of the determined event and gives them to the three-dimensional rendering program.

Figure 11:
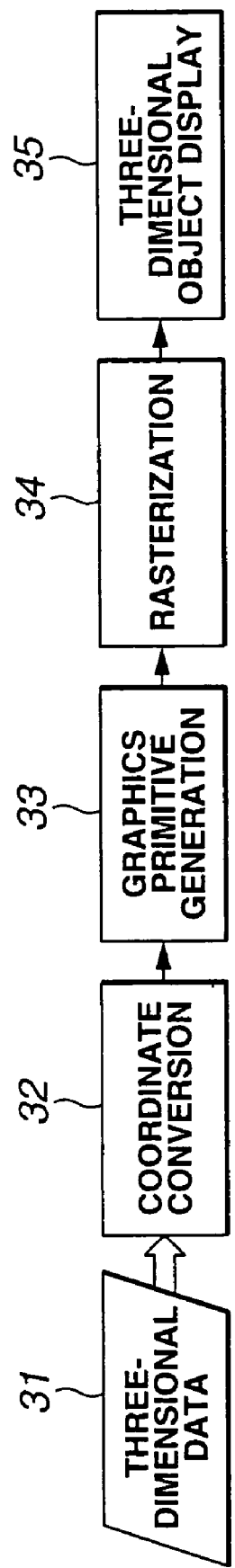
FIG. 11 shows a procedure for rendering a typical three-dimensional model data.

Next, the three-dimensional rendering program will be explained. FIG. 11 shows a procedure for rendering a typical three-dimensional model data according to the three-dimensional rendering program.

According to the three-dimensional rendering program, model data 31 on a three-dimensional object such as an icon, including positions, in a three-dimensional coordinate, of graphics primitives such as a polygon, point, line, plane, etc., attributes of the line and plane, color data, etc. are read from the ROM 21 and three-dimensional coordinates of all points of the three-dimensional object are converted into two-dimensional coordinates (coordinate conversion 32). Next, the three-dimensional object data having been converted into the two-dimensional coordinates are sorted in units of a graphics primitive starting with a one farthest from the point of view to finally leave only viewable points. This is called "hidden surface elimination" (graphics primitive generation 33). Then, a color number of each pixel is written to the frame buffer area (color buffer) on the basis of the three-dimensional object data having undergone the hidden surface elimination (rasterization 34). From a color table in which the relation between RGB value and color number is stored, a relevant RGB value is evoked on the basis of a color number of each pixel stored in the color buffer and converted into video signal which can be processed in the display unit, and the video signal is displayed on the display device 6 (three-dimensional object display 35).

Next, operations made in manipulating the three-dimensional object by the touch-operated input device 7 will be described.

Figure 5:
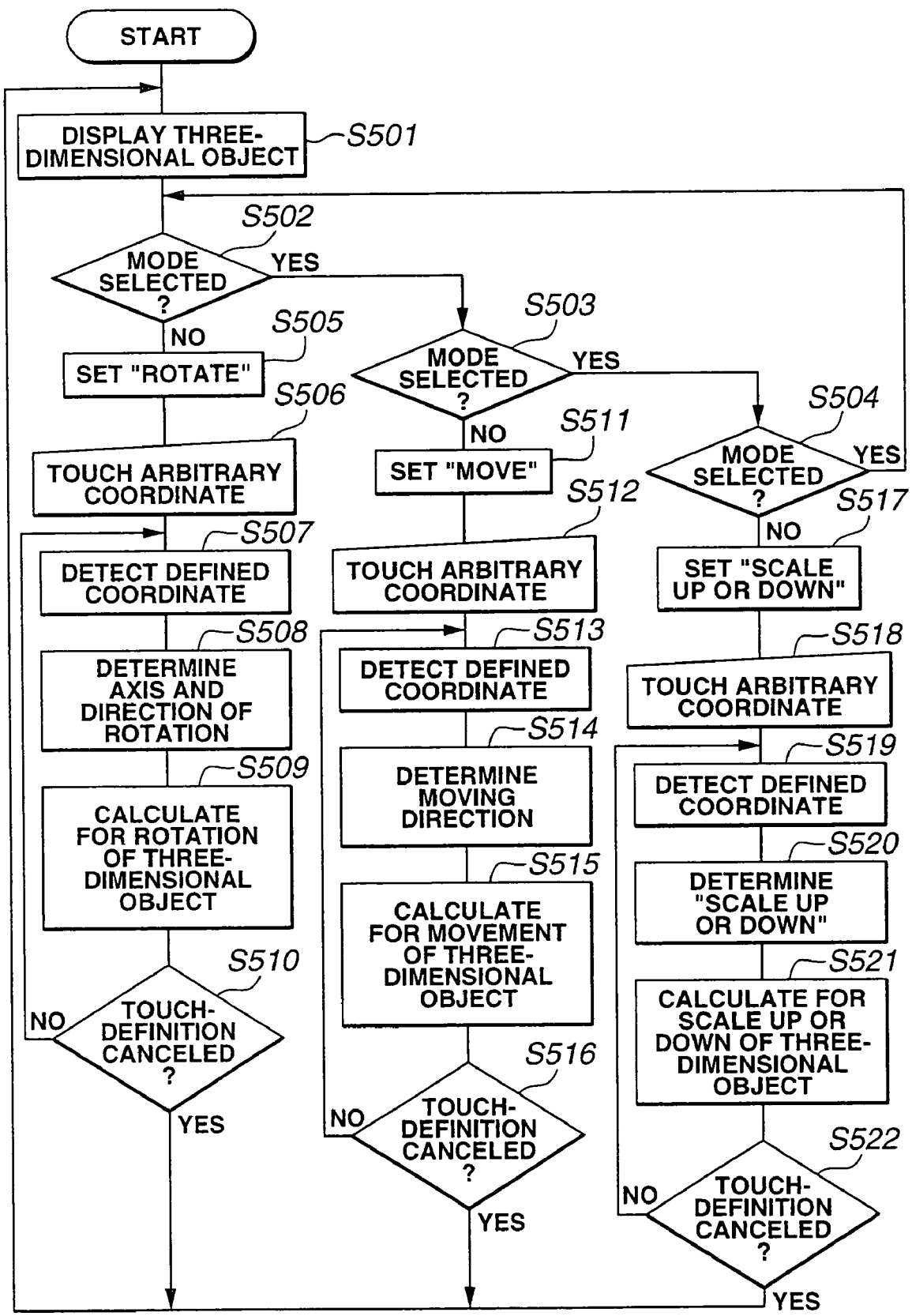
FIG. 5 shows a flow of operations made in manipulating a three-dimensional object by the touch-operated input device.
Figure 6A:
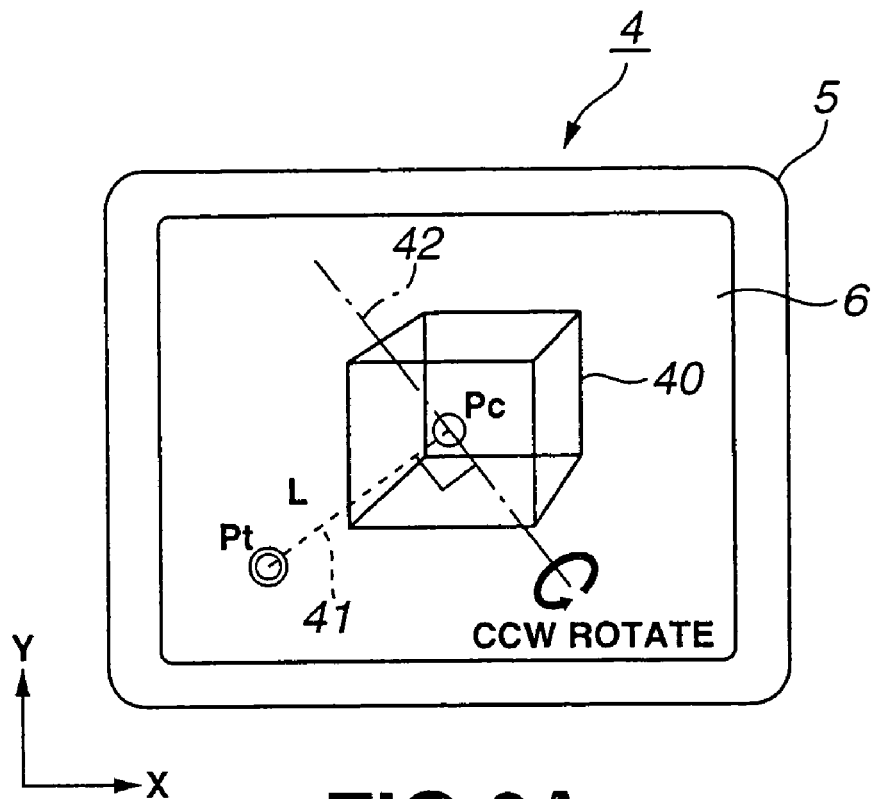
FIGS. 6A and 6B show a rotation of a three-dimensional object.
Figure 6B:
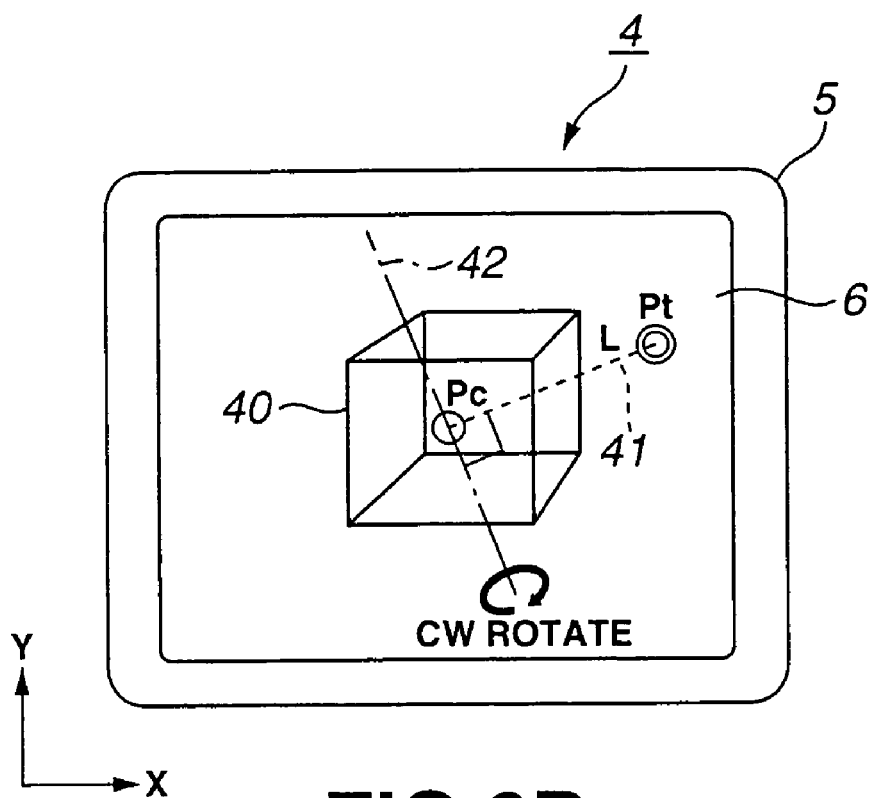
Figure 7:
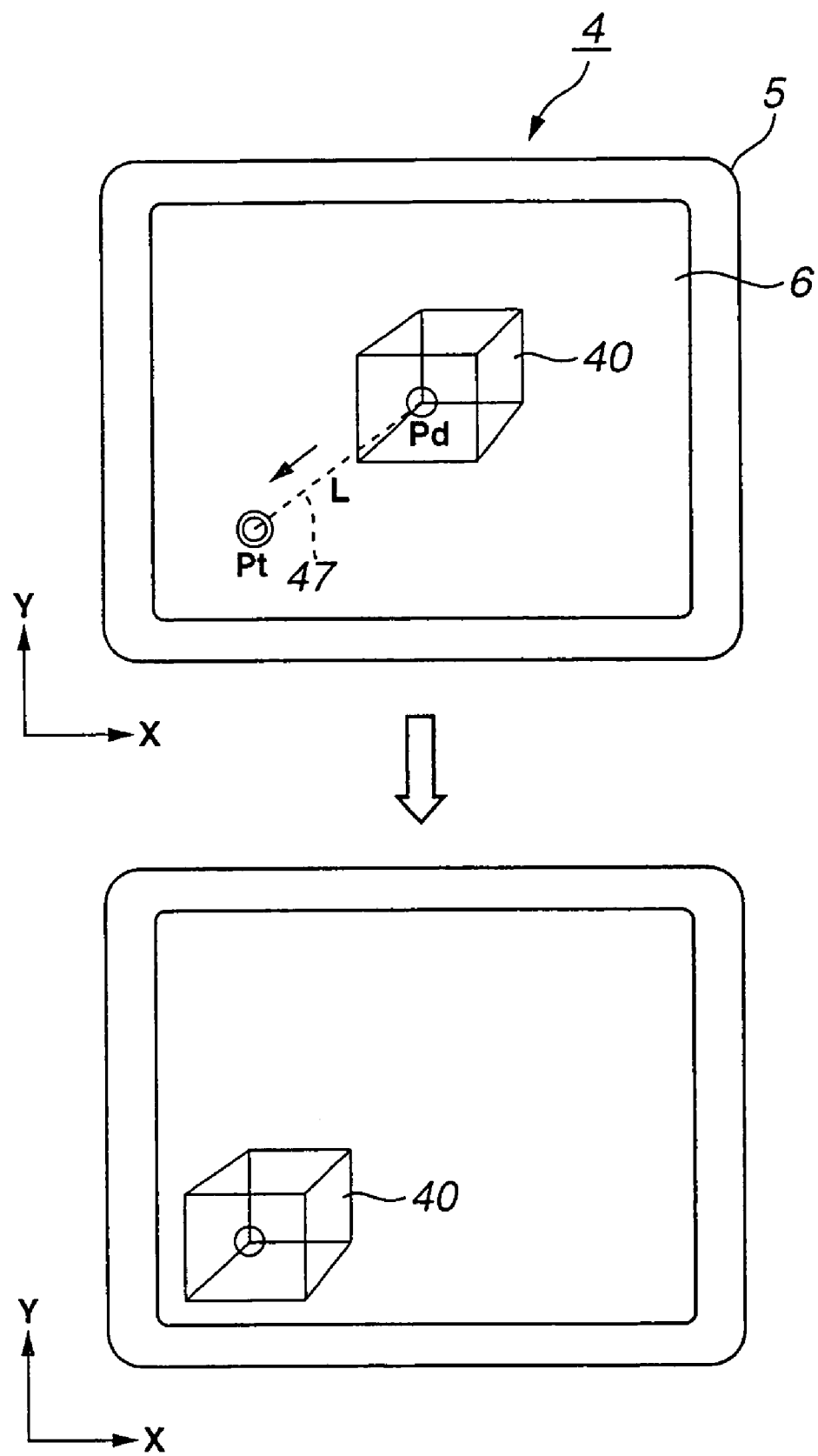
FIG. 7 shows a movement of a three-dimensional object.

FIG. 5 shows a flow of operations made in manipulating the three-dimensional object by the touch-operated input device 7, FIG. 6 shows a rotation of the three-dimensional object, FIG. 7 shows a movement of the three-dimensional object, and FIGS. 8 and 9 show a scale-up or -down of the three-dimensional object.

Now in step S501, a three-dimensional object 40 as shown in FIG. 2 is displayed on the screen of the display device 6. The three-dimensional object 49 has been processed for rendering by the three-dimensional rendering program.

Based on a command and coordinate data from the touch-input conversion program, the three-dimensional rendering program has rotates, moves, scales up or down the three-dimensional object 40 as will be described below.

First in steps S502 to S504, the three-dimensional rendering program selects a mode of manipulation for the three-dimensional object 40. In response to a manipulation mode select command supplied from the touch-input conversion program, the three-dimensional rendering program selects modes of manipulation in a predetermined sequence. Each time a manipulation mode select command is supplied from the touch-input conversion program, the mode of manipulation is changed in a sequence of "rotate", "move" and "scale-up/-down". When a further manipulation mode select command is supplied while the mode of manipulation is "scale-up/-down", the mode of operation is switched again to "rotate".

The touch-input conversion program determines that two successive touching operations have been made at the touch-operated input device 7, which meets a predetermined timing requirement for the touch-operated input device 7, for example, and it gives a manipulation mode select command to the three-dimensional rendering program. The two successive touching operations made to the touch-operated input device 7 are equivalent to the "double clicking" well known as an operation of the mouse or the like. However, the operations for mode selection are not limited to the two successive touching operations, that is, "double-licking" but may be predetermined operations, such as "push-in" and "CW/CCW rotate", of any other control than the touch-operated input device 7, for example, a jog dial provided at the display unit 4 with a touch sensor. Alternatively, the mode selection may be an operation of a switch to generate such a mode select command.

Rotation of the Three-dimensional Object 40

It is assumed here that "rotate" is set as the mode of manipulation of the three-dimensional object 40 in step S505. The touch-input conversion program monitors whether a user-defined coordinate has been supplied from the touch-operated input device 7. In step S506, the user touches the display screen of the touch-operated input device 7 to define an arbitrary coordinate. When the touch-operated input device 7 detects the user-defined coordinate, made by touching the display screen, in step S507, it gives the user-defined coordinate to the touch-input conversion program.

In step S508, the touch-input conversion program determines an axis and direction of rotation for the three-dimensional object 40 on the basis of the supplied user-defined coordinate.

More specifically, when it is assumed as shown in FIGS. 6A and 6B that the user-defined coordinate is Pt and central coordinate on the display screen is Pc, the touch-input conversion program determines, as an axis of rotation 42 for the three-dimensional object 40, a straight line 42 perpendicular, on the display screen, to a straight line 41 connecting the user-defined coordinate Pt and screen-central coordinate Pc and passing by an origin of the three-dimensional space (central coordinate), while determining a direction of rotation for the three-dimensional object 40 depending upon whether the user-defined coordinate Pt is located above or below the axis of rotation 42 on the display screen. In case the user-defined coordinate Pt is below the axis of rotation 42 on the display screen as shown in FIG. 6A, for example, the touch-input conversion program will determine that the direction of rotation is counterclockwise. On the other hand, when the user-defined coordinate Pt is above the axis of rotation 42 on the display screen as shown in FIG. 6B, the touch-input conversion program will determine that the direction of rotation is clockwise.

Alternatively, the system may be arranged such that the touch-input conversion program will determine an axis and direction of rotation for the three-dimensional object 40 on the basis of a relation between the user-defined coordinate and position of the center of gravity of the three-dimensional object 40. In this case, the touch-input conversion program determines, as an axis of rotation for the three-dimensional object 40, a straight line perpendicular, on the display screen, to a straight line connecting the user-defined coordinate and position of the center of gravity of the three-dimensional object 40 on the display screen and passing by the position of the center of gravity of the three-dimensional object 40 on the display screen while the direction of rotation depending upon whether the user-defined coordinate is located above or below the axis of rotation 42 on the display screen.

Note that to differentiate a single operation of touching the display screen of the touch-operated input device 7 by the user from two successive touching operations (double-clicking), the touch-input conversion program detects whether the user has defined, by touching, an arbitrary coordinate on the display screen successively for more than a predetermined length of time.

Then, the touch-input conversion program will convert the determined axis and direction of rotation and a predetermined angle of rotation (rotating speed) into information, respectively, interpretable by the three-dimensional rendering program, and gives the information to the three-dimensional rendering program. The three-dimensional rendering program will make, in step S509, a calculation for rotating the three-dimensional object 40 on the basis of the axis, direction and angle (speed) of rotation supplied from the touch-input conversion program. Thus, the three-dimensional object 40 is rotated.

While the user is keeping a coordinate defined by continuously touching the display screen, the touch-input conversion program repeatedly calculates an axis and direction of rotation in a constant cycle (for example, an integral multiple of a frame period) and gives the result of calculation to the three-dimensional rendering program at each time. When the angle of rotation given once to the three-dimensional rendering program is fixed, the three-dimensional object 40 rotates at a constant speed on the display screen. The fixed angle of rotation may also be preset by the user through preference.

Also, each time the user defines another position while touching the display screen, the results of calculation of an axis and direction of rotation will vary, and thus the three-dimensional object 40 will rotate in a dynamically changed manner.

When the coordinate definition by the user touching the display screen is canceled (when the result of determination is affirmative (YES) in step S510)), the touch-input conversion program ceases giving information to the three-dimensional rendering program, and the three-dimensional object 40 stops being rotated. Unless any other mode of manipulation is selected, the touch-input conversion program determines an axis and direction of rotation for the three-dimensional object 40 on the basis of a coordinated newly defined by the user on the display screen and rotates the three-dimensional 40 on the display screen.

Movement of the Three-dimensional Object 40

It is assumed here that "move" is set as the mode of manipulation of the three-dimensional object 40 in step S511. The touch-input conversion program monitors how the touch-operated input device 7 is operated by touching. In step S512, the user touches the display screen of the touch-operated input device 7 to define an arbitrary coordinate. When the touch-operated input device 7 detects a user-defined coordinate in step S513, it gives the user-defined coordinate to the touch-input conversion program.

In step S514, the touch-input conversion program determines a moving direction for the three-dimensional object 40 on the basis of the user-defined coordinate and a coordinate of the center of gravity of the three-dimensional object 40 on the display screen.

More specifically, when it is assumed as shown in FIG. 7 that the user-defined coordinate is Pt and gravity-center coordinate of the three-dimensional object 40 on the display screen is Pd, the touch-input conversion program determines, as a moving direction for the three-dimensional object 40, a straight line 47 connecting the gravity-center coordinate Pd and user-defined coordinate Pt.

Then, the touch-input conversion program will convert the determined moving direction and a constant moving distance into information interpretable by the three-dimensional rendering program, and gives the information to the three-dimensional rendering program. The three-dimensional rendering program will make, in step S515, a calculation for moving the three-dimensional object 40 on the basis of the moving direction and distance information supplied from the touch-input conversion program. Thus, the three-dimensional object 40 is moved.

While the user is keeping a coordinate defined by continuously touching the display screen, the touch-input conversion program continuously gives a moving direction and distance of direction to the three-dimensional rendering program. It should be noted that the value of a moving distance given by one information to the three-dimensional rendering program is fixed and as such information is continuously given to the three-dimensional rendering program, the three-dimensional object 40 will move at a constant speed on the display screen. The moving speed may be preset by the user through preference.

Also, each time the user defines another position while touching the display screen, the results of calculation of a moving direction will vary, and thus the three-dimensional object 40 will move in a dynamically changed manner.

When the coordinate definition by the user touching the display screen is canceled (when the result of determination in step S516 is affirmative (YES)), the three-dimensional rendering program will exit the moving manipulation of the three-dimensional object 40.

Scale-up/-down of the Three-dimensional Object 40

It is assumed here that "scale-up/-down" is set as the mode of manipulation of the three-dimensional object 40 in step S517. The touch-input conversion program monitors whether a user-defined coordinate has been supplied from the touch-operated input device 7. In step S518, the user touches the display screen of the touch-operated input device 7 to define an arbitrary coordinate. When the touch-operated input device 7 detects the coordinate defined by the user in step S519, it gives the user-defined coordinate to the touch-input conversion program.

Figure 8A:
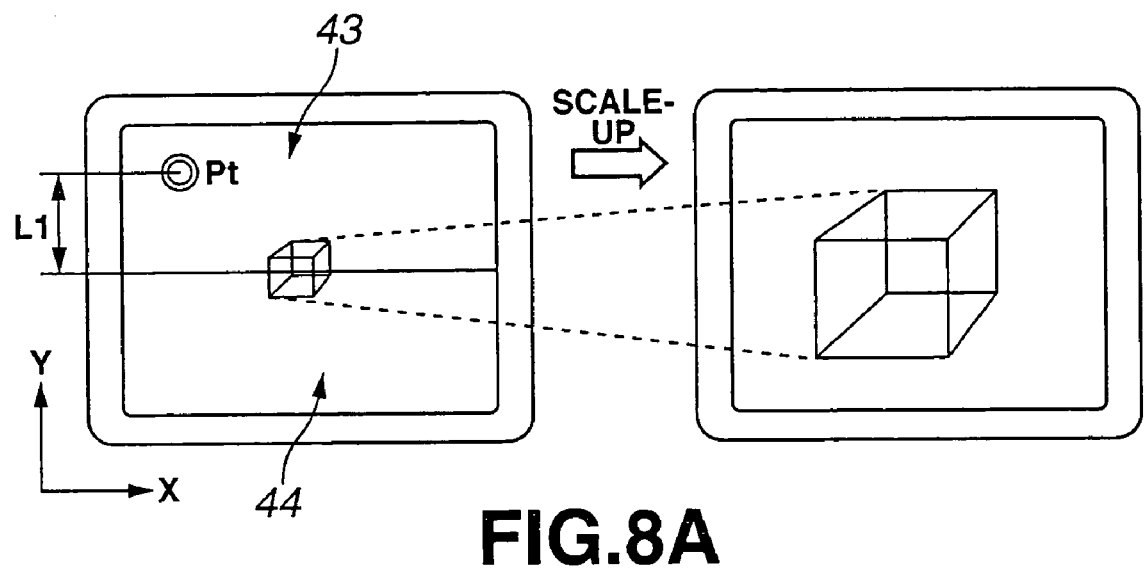
FIGS. 8A and 8B show a scale-up and -down of a three-dimensional object.
Figure 8B:
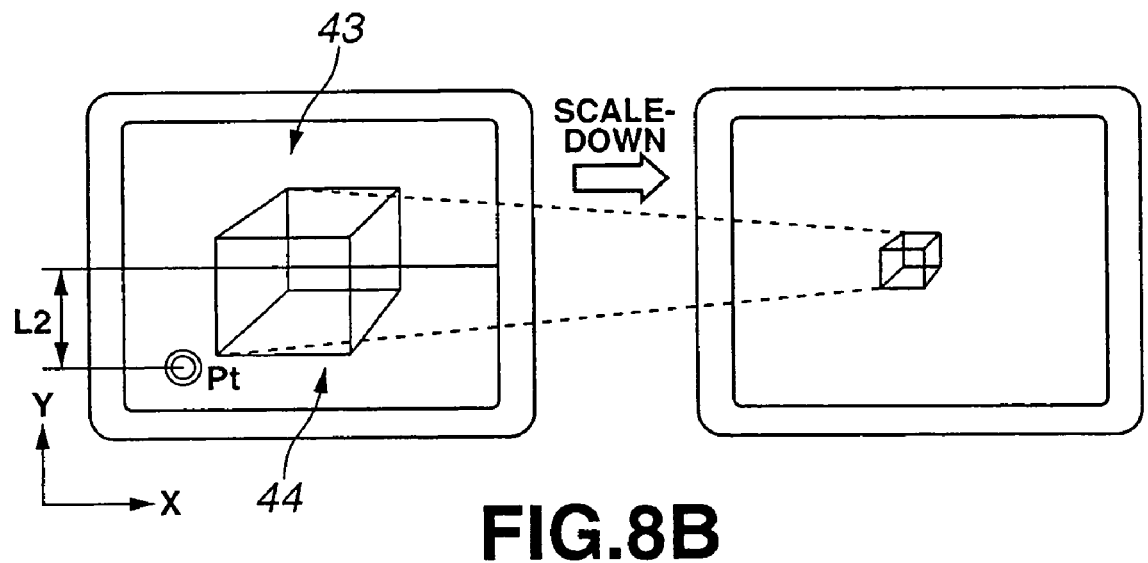
Figure 9A:
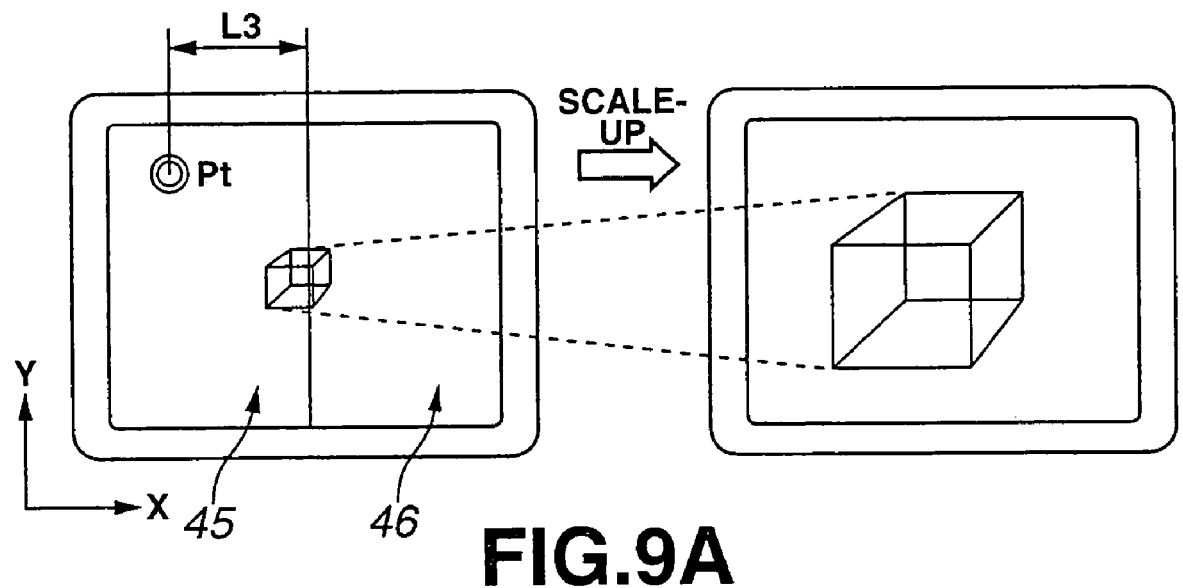
FIGS. 9A and 9B show another scale-up and -down of a three-dimensional object.
Figure 9B:
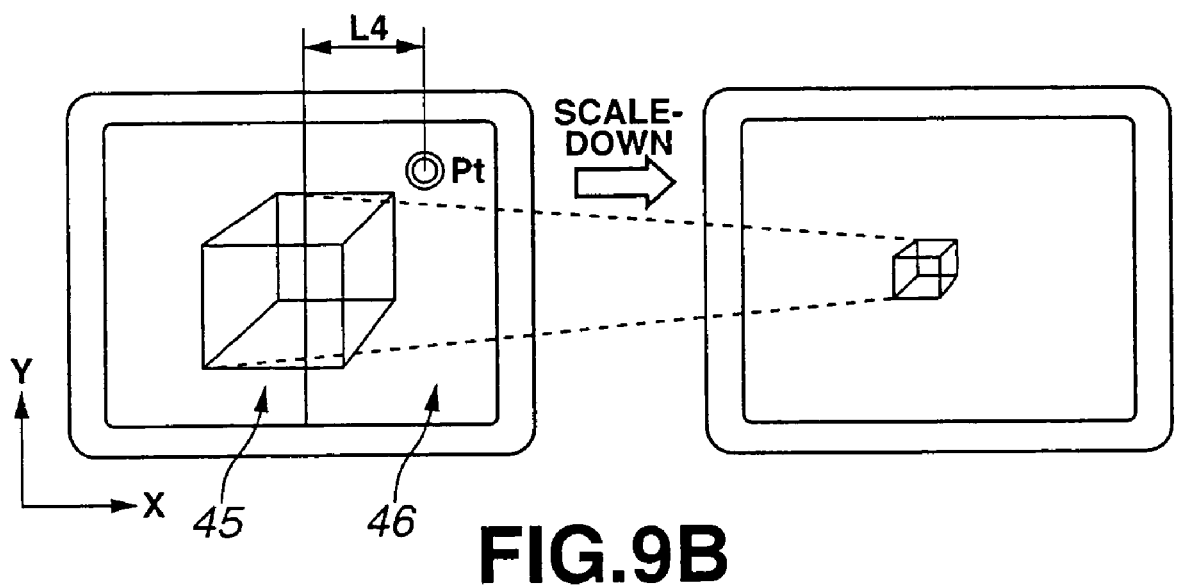

In step S520, the touch-input conversion program determines whether the three-dimensional object 40 is to be scaled up or down on the basis of the user-defined coordinate supplied from the touch-operated input device 7. More specifically, when the user-defined coordinate Pt is in an upper-half area 43 of the whole area of the display screen, for example, as shown in FIGS. 8A and 8B, the touch-input conversion program determines that the three-dimensional object 40 should be "scaled up". On the other hand, if the user-defined coordinate Pt is in a lower-half area 44, the touch-input conversion program will determine that the three-dimensional object 40 should be "scaled down". Also, the system may be defined such that when the user-defined coordinate Pt is in a left half 45 of the entire area of the display screen as shown in FIG. 9A and 9B, the touch-input conversion program will determine that the three-dimensional object 40 should be "scaled up" while if the user-defined coordinate Pt is in a right half 46, the touch-input conversion program will determine that the three-dimensional object 40 should be "scaled down"

Then, the touch-input conversion program will convert the determined manipulation (scale up or down) and constant ratio of scale up or down into information interpretable by the three-dimensional rendering program, and gives the information to the three-dimensional rendering program. The three-dimensional rendering program will make, in step S521, a calculation for scaling up or down the three-dimensional object 40 on the basis of the information on the determined manipulation and scale up or down ratio. Thus, the three-dimensional object 40 is scaled up or down.

While the user is keeping a coordinate defined by continuously touching the display screen, the touch-input conversion program continuously gives the determined manipulation and scale up or down ratio to the three-dimensional rendering program. It should be noted that the value of the move-in or -out ratio given by one information to the three-dimensional rendering program is fixed and as such information is continuously given to the three-dimensional rendering program, the three-dimensional object 40 will be scaled up or down at a constant speed on the display screen. The scale up or down speed may be preset by the user through preference. When the coordinate definition by the user touching the display screen is canceled (when the result of determination in step S522 is affirmative (YES)), the three-dimensional rendering program will exit the scale up or down manipulation of the three-dimensional object 40.

According to the first embodiment of the present invention, the user can easily manipulate, namely, rotate, move, scale up or down, the three-dimensional object 40 by defining a coordinate on the display screen by touching the latter. Also, since the user can rotate, move, scale up or down the three-dimensional object 40 only while he or she is touching the display screen, he can intuitively make an intended manipulation of the three-dimensional object 40. Therefore, in case the user wants to view another screen by rotating a three-dimensional object or in case he wants to move a three-dimensional object to any other place or scale it down because the three-dimensional object is an obstacle on the display screen, the he can easily manipulate the three-dimensional object.

Figure 10:
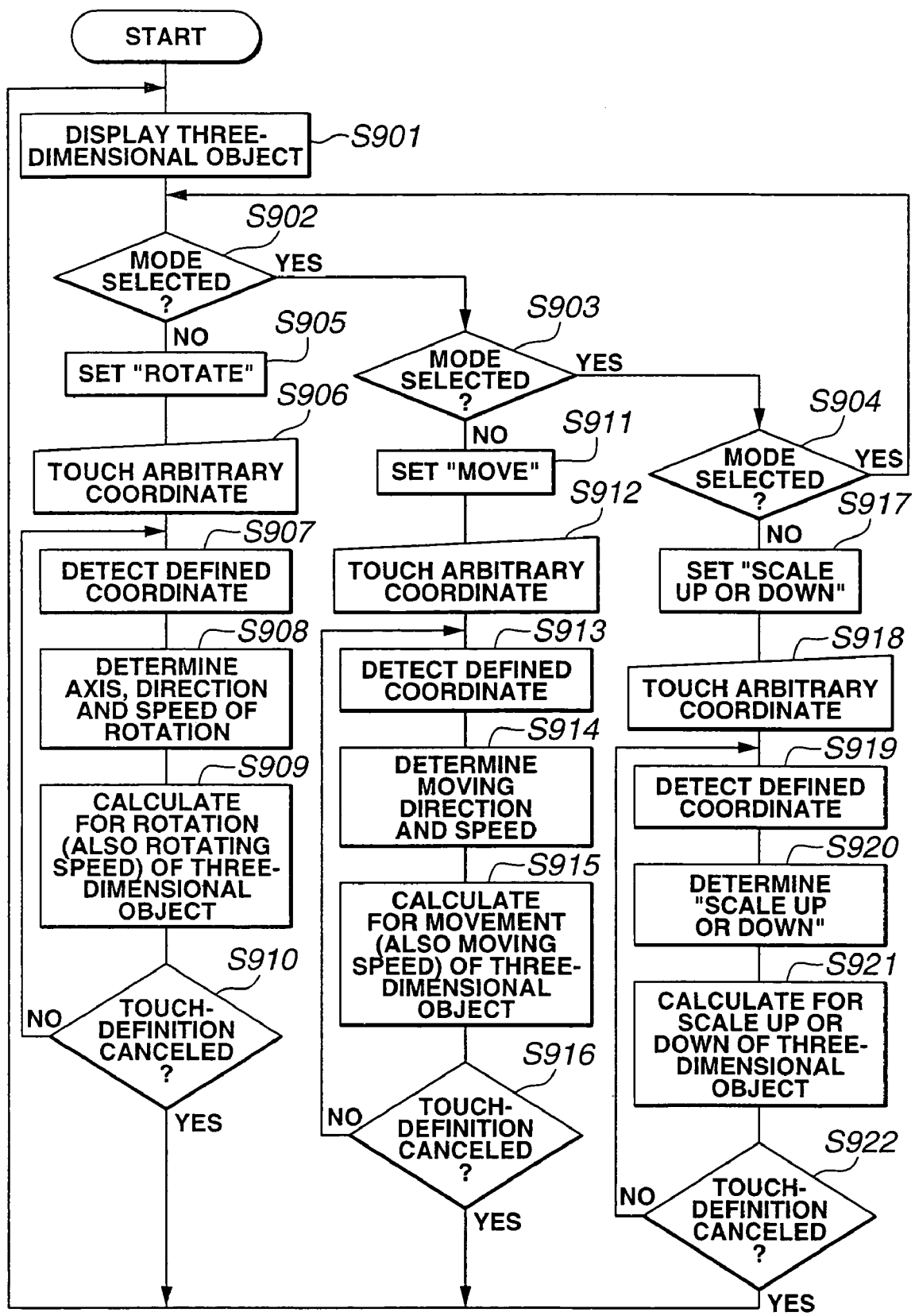
FIG. 10 shows a flow of operations made in manipulating a three-dimensional object by the touch-operated input device in a digital video camcorder as a second embodiment of the electronic appliance according to the present invention.

Next, the second embodiment of the present invention will be illustrated and described below:

FIG. 10 shows a flow of operations made in manipulating a three-dimensional object with the use of the touch-operated input device 7. In this flow chart, the display of a three-dimensional object 40 on the screen of the display device 6 in step S901, and the procedure for selection of a mode of manipulation of the three-dimensional object 40 in steps S902 to S904, are the same as those in the flow chart in FIG. 5 showing the flow of operations made in the first embodiment.

Rotation of the Three-dimensional 40

It is assumed here that "rotate" is set as the mode of manipulation of the three-dimensional object 40 in step S905. The touch-input conversion program monitors whether a user-defined coordinate has been supplied from the touch-operated input device 7. In step S906, the user touches the display screen of the touch-operated input device 7 to define an arbitrary coordinate. When the touch-operated input device 7 detects the user-defined coordinate, made by touching the display screen, in step S907, it gives the user-defined coordinate to the touch-input conversion program.

In step S908, the touch-input conversion program determines an axis, direction and speed of rotation for the three-dimensional object 40 on the basis of the supplied user-defined coordinate.

More specifically, when it is assumed as shown in FIGS. 6A and 6B that the user-defined coordinate is Pt and central coordinate on the display screen is Pc, the touch-input conversion program determines, as an axis of rotation 42 for the three-dimensional object 40, a straight line 42 perpendicular, on the display screen, to a straight line 41 connecting the user-defined coordinate Pt and screen-central coordinate Pc and passing by an origin of the three-dimensional space (central coordinate), while determining a direction of rotation for the three-dimensional object 40 depending upon whether the user-defined coordinate Pt is located above or below the axis of rotation 42 on the display screen. Further, the touch-input conversion program determines a rotating speed for the three-dimensional object 40 on the basis of a distance between the user-defined coordinate Pt and screen-center coordinate Pc. On the assumption that the distance between the user-defined coordinate Pt and screen-center coordinate Pc is L and a coefficient for determination of the rotating speed for the three-dimensional object 40 is $\alpha$ as shown in FIGS. 6A and 6B, the rotating speed r (radian) of the three-dimensional object 40 is $r=\alpha L$. It should be noted that the system may be arranged such that the user can freely set the value of the coefficient $\alpha$.

Also, in case the system is arranged such that the touch-input conversion program will determine an axis and direction of rotation for the three-dimensional object 40 on the basis of the relation between the user-defined coordinate and the on-screen position of the center of gravity of the three-dimensional object 40, a rotating speed for the three-dimensional object 40 may be determined on the basis of the user-defined coordinate and on-screen position of the center of gravity of the three-dimensional object 40.

Then, the touch-input conversion program will convert the determined axis, direction and speed of rotation into information, respectively, interpretable by the three-dimensional rendering program, and gives the information to the three-dimensional rendering program. The three-dimensional rendering program will make, in step S909, a calculation for rotating the three-dimensional object 40 on the basis of the axis, direction and speed of rotation supplied from the touch-input conversion program. Thus, the three-dimensional object 40 is rotated.

While the user is keeping a coordinate defined by continuously touching the display screen, the touch-input conversion program repeatedly calculates an axis, direction and speed of rotation in a constant cycle (for example, an integral multiple of a frame period) and gives the result of calculation to the three-dimensional rendering program at each time. The rotating-speed information is given as an angle of rotation for a constant period to the three-dimensional rendering program. Thus, the three-dimensional object 40 will be rotated on the display screen at a user-intended speed. Therefore, each time the user defines another position while touching the display screen, the results of calculation of an axis, direction and speed of rotation will vary, and thus the three-dimensional object 40 will rotate in a dynamically changed manner and speed.

When the coordinate definition by the user touching the display screen is canceled (when the result of determination is affirmative (YES) in step S910)), the touch-input conversion program ceases giving information to the three-dimensional rendering program, and the three-dimensional object 40 stops being rotated. Unless any other mode of manipulation is selected, the touch-input conversion program determines an axis, direction and speed of rotation for the three-dimensional object 40 on the basis of a coordinated newly defined by the user on the display screen and rotates the three-dimensional 40 on the display screen.

Movement of the Three-dimensional Object 40

It is assumed here that "move" is set as the mode of manipulation of the three-dimensional object 40 in step S911. The touch-input conversion program monitors how the touch-operated input device 7 is operated by touching. In step S912, the user touches the display screen of the touch-operated input device 7 to define an arbitrary coordinate. When the touch-operated input device 7 detects a user-defined coordinate in step S913, it gives the user-defined coordinate to the touch-input conversion program.

In step S914, the touch-input conversion program determines a direction and speed of movement for the three-dimensional object 40 on the basis of the supplied user-defined coordinate and a coordinate of the center of gravity of the three-dimensional object 40 on the display screen.

More specifically, when it is assumed as shown in FIG. 7 that the user-defined coordinate is Pt and gravity-center coordinate of the three-dimensional object 40 on the display screen is Pd, the touch-input conversion program determines, as a moving direction for the three-dimensional object 40, a straight line 47 connecting the gravity-center coordinate Pd and user-defined coordinate Pt. The moving speed is determined on the basis of a distance between the user-defined coordinate Pt and gravity-center coordinate Pd. On the assumption that the distance between the user-defined coordinate Pt and gravity-enter coordinate Pd is L and a coefficient for determination of a moving speed for the three-dimensional object 40 is $\beta$ as shown in FIG. 7 for example, the moving speed a of the three-dimensional object 40 will be $a=\beta L$. It should be noted that the system may be arranged such that the user can freely set the value of the coefficient $\beta$.

Then, the touch-input conversion program will convert the determined moving direction and speed into information, respectively, interpretable by the three-dimensional rendering program, and gives the information to the three-dimensional rendering program. The three-dimensional rendering program will make, in step S915, a calculation for moving the three-dimensional object 40 on the basis of the moving direction and speed information supplied from the touch-input conversion program. Thus, the three-dimensional object 40 is moved.

While the user is keeping a coordinate defined by continuously touching the display screen, the touch-input conversion program repeatedly calculates a moving direction and speed in a constant cycle (for example, an integral multiple of a frame period) and gives the result of calculation to the three-dimensional rendering program at each time. The moving-speed information is given as a moving distance for a constant period to the three-dimensional rendering program. Thus, the three-dimensional object 40 will be moved on the display screen at a user-intended speed. Therefore, each time the user defines another position while touching the display screen, the results of calculation of a moving direction and speed will vary, and thus the three-dimensional object 40 will move in a dynamically changed manner and speed.

When the coordinate definition by the user touching the display screen is canceled (when the result of determination in step S916 is affirmative (YES)), the touch-input conversion program ceases giving information to the three-dimensional rendering program and the three-dimensional rendering program will exit the moving manipulation of the three-dimensional object 40.

The three-dimensional object 40 can be scaled up or down in the same manner as in the first embodiment.

As above, the embodiments of the present invention, the three-dimensional object 40 being displayed can be rotated or moved at a user-intended speed by the user touching a coordinate on the display screen, and thus the user can manipulate the three-dimensional object 40 in a more intuitive manner.

The aforementioned embodiments of the present invention provide a digital video camcorder with which the user can intuitively manipulate the three-dimensional object 40.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The three-dimensional object manipulating system using the touch-operated input device according to the present invention is applicable to a digital video camcorder as well as to a portable electronic appliance such as a portable phone, PDA or the like and all electronic appliances, not portable, such as a computer.

As having been described in the foregoing, the user can intuitively make a user-intended manipulation, namely, rotation, movement or scale-up or -down of a three-dimensional object just by defining a coordinate on a display screen by touching the latter.

What is claimed is:

1. A three-dimensional object manipulating apparatus, comprising:
    a display means for displaying a three-dimensional object on the screen of a display unit;
    a coordinate detecting means for detecting a coordinate defined on the display screen by a user's physical touch on the display screen;
    an axis determination means for determining an axis of rotation of the three-dimensional object as a first line through a center of the display screen perpendicular to a second line from the detected coordinate through the center of the display screen;
    a rotation determination means for determining a direction of rotation about the axis of rotation for the three-dimensional object in a predetermined cycle on the basis of the coordinate detected by the coordinate detecting means; and
    an object rotating means for rotating the three-dimensional object about the axis of rotation in the direction of rotation,
    wherein the three-dimensional object stops rotating when the coordinate detecting means no longer detects a coordinate defined on the display screen by a user's physical touch on the display screen.

2. A three-dimensional object manipulating apparatus, comprising:
    a display means for displaying a three-dimensional object on the screen of a display unit;
    a coordinate detecting means for detecting a coordinate defined on the display screen by a user's physical touch on the display screen;
    an axis determination means for determining an axis of rotation of the three-dimensional object as a first line through a barycenter of the three-dimensional object displayed on the screen perpendicular to a second line from the detected coordinate through the barycenter of the three-dimensional object displayed on the display screen;

a rotation determination means for determining a direction of rotation about the axis of rotation for the three-dimensional object in a predetermined cycle on the basis of the coordinate detected by the coordinate detecting means; and an object rotating means for rotating the three-dimensional object about the axis of rotation in the direction of rotation, wherein the three-dimensional object stops rotating when the coordinate detecting means no longer detects a coordinate defined on the display screen by a user's physical touch on the display screen.

3. A three-dimensional object manipulating method in which a display screen, a data processor, and a touch-sensitive coordinate detector are used, the method comprising the steps of:

displaying, under control of the data processor, a three-dimensional object on the display screen;

detecting a first coordinate defined on the display screen by a user's physical touch on the display screen;

determining, under control of the data processor, an axis of rotation of the three-dimensional object as a first line through a center of the display screen perpendicular to a second line from the detected first coordinate through the center of the display screen;

determining, under control of the data processor, a direction of rotation for the three-dimensional object in a predetermined cycle on the basis of the first coordinate detected by the coordinate detector;

rotating, under control of the data processor, the three-dimensional object about the determined axis of rotation in the determined direction of rotation;

detecting a second coordinate defined on the display screen by a user's physical touch on the display screen; and dynamically changing the determined axis and direction of rotation based on the second coordinate, wherein the determined axis and direction of rotation stops changing when the first and second coordinates defined on the display screen by a user's physical touch on the display screen are no longer detected.

4. A three-dimensional object manipulating method in which a display screen, a data processor, and a touch-sensitive coordinate detector are used, the method comprising the steps of:

displaying, under control of the data processor, a three-dimensional object on the display screen;

detecting a first coordinate defined on the display screen by a user's physical touch on the display screen;

determining, under control of the data processor, an axis of rotation of the three-dimensional object as a first line through a barycenter of the three-dimensional object displayed on the screen perpendicular to a second line from the detected first coordinate through the barycenter of the three-dimensional object displayed on the display screen;

determining, under control of the data processor, a direction of rotation for the three-dimensional object in a predetermined cycle on the basis of the first coordinate detected by the coordinate detector;

rotating, under control of the data processor, the three-dimensional object about the determined axis of rotation in the determined direction of rotation;

detecting a second coordinate defined on the display screen by a user's physical touch on the display screen; and dynamically changing the determined axis and direction of rotation based on the second coordinate, wherein the determined axis and direction of rotation stops changing when the first and second coordinates defined on the display screen by a user's physical touch on the display screen are no longer detected.

5. A computer readable media comprising computer readable instructions for allowing a computer to function as:

a display means for displaying a three-dimensional object on the screen of a display unit;

a coordinate detecting means for detecting a coordinate defined on the display screen by a user's physical touch on the display screen;

an axis determination means for determining an axis of rotation of the three-dimensional object as a first line through a center of the display screen perpendicular to a second line from the detected coordinate through the center of the display screen;

a rotation determination means for determining a direction of rotation for the three-dimensional object about the axis of rotation in a predetermined cycle on the basis of the coordinate detected by the coordinate detecting means; and an object rotating means for rotating the three-dimensional object about the determined axis of rotation in the determined direction of rotation, wherein the three-dimensional object stops rotating when the coordinate detecting means no longer detects a coordinate defined on the display screen by a user's physical touch on the display screen.

6. A computer readable media comprising computer readable instructions for allowing a computer to function as:

a display means for displaying a three-dimensional object on the screen of a display unit;

a coordinate detecting means for detecting a coordinate defined on the display screen by a user's physical touch on the display screen;

an axis determination means for determining an axis of rotation of the three-dimensional object as a first line through a barycenter of the three-dimensional object displayed on the display screen perpendicular to a second line from the detected coordinate through the barycenter of the three-dimensional object displayed on the display screen;

a rotation determination means for determining a direction of rotation for the three-dimensional object about the axis of rotation in a predetermined cycle on the basis of the coordinate detected by the coordinate detecting means; and an object rotating means for rotating the three-dimensional object about the determined axis of rotation in the determined direction of rotation, wherein the three-dimensional object stops rotating when the coordinate detecting means no longer detects a coordinate defined on the display screen by a user's physical touch on the display screen.

* * * * *